United States Patent [19]
Virog, Jr. et al.

[11] 4,269,320
[45] * May 26, 1981

[54] BLOW MOLDED PLASTIC BOTTLE AND ANTI-TAMPER CAP

[75] Inventors: John J. Virog, Jr., Massapequa Park; Leo Von Hagel, North Massapequa, both of N.Y.

[73] Assignee: Maxcap, Inc., New York, N.Y.

[*] Notice: The portion of the term of this patent subsequent to Jul. 4, 1995, has been disclaimed.

[21] Appl. No.: 106,052

[22] Filed: Dec. 21, 1979

Related U.S. Application Data

[63] Continuation of Ser. No. 921,043, Jun. 30, 1978, Pat. No. 4,180,175, which is a continuation of Ser. No. 770,025, Feb. 18, 1977, Pat. No. 4,098,419.

[51] Int. Cl.³ .............................................. B65D 55/02
[52] U.S. Cl. .................................... 215/252; 215/344; 215/DIG. 1
[58] Field of Search ................ 215/252, 31, 329, 344, 215/DIG. 1

[56] References Cited

U.S. PATENT DOCUMENTS

| | | | |
|---|---|---|---|
| 3,805,987 | 4/1974 | Horvath | 215/252 |
| 3,901,404 | 8/1975 | Feldman | 215/344 X |
| 3,904,061 | 9/1975 | Keeler | 215/252 |
| 3,980,195 | 9/1976 | Fillmore | 215/252 X |
| 4,126,240 | 11/1978 | Brach | 215/252 |

Primary Examiner—Donald F. Norton
Attorney, Agent, or Firm—Abner Sheffer

[57] ABSTRACT

A bottle and cap construction for thin-walled plastic milk bottles. It has a double thread and an anti-tamper arrangement. The cap has a plug which engages a lip on the bottle resulting in the upper wall of the cap moving to a substantially symmetrically domed configuration.

1 Claim, 29 Drawing Figures

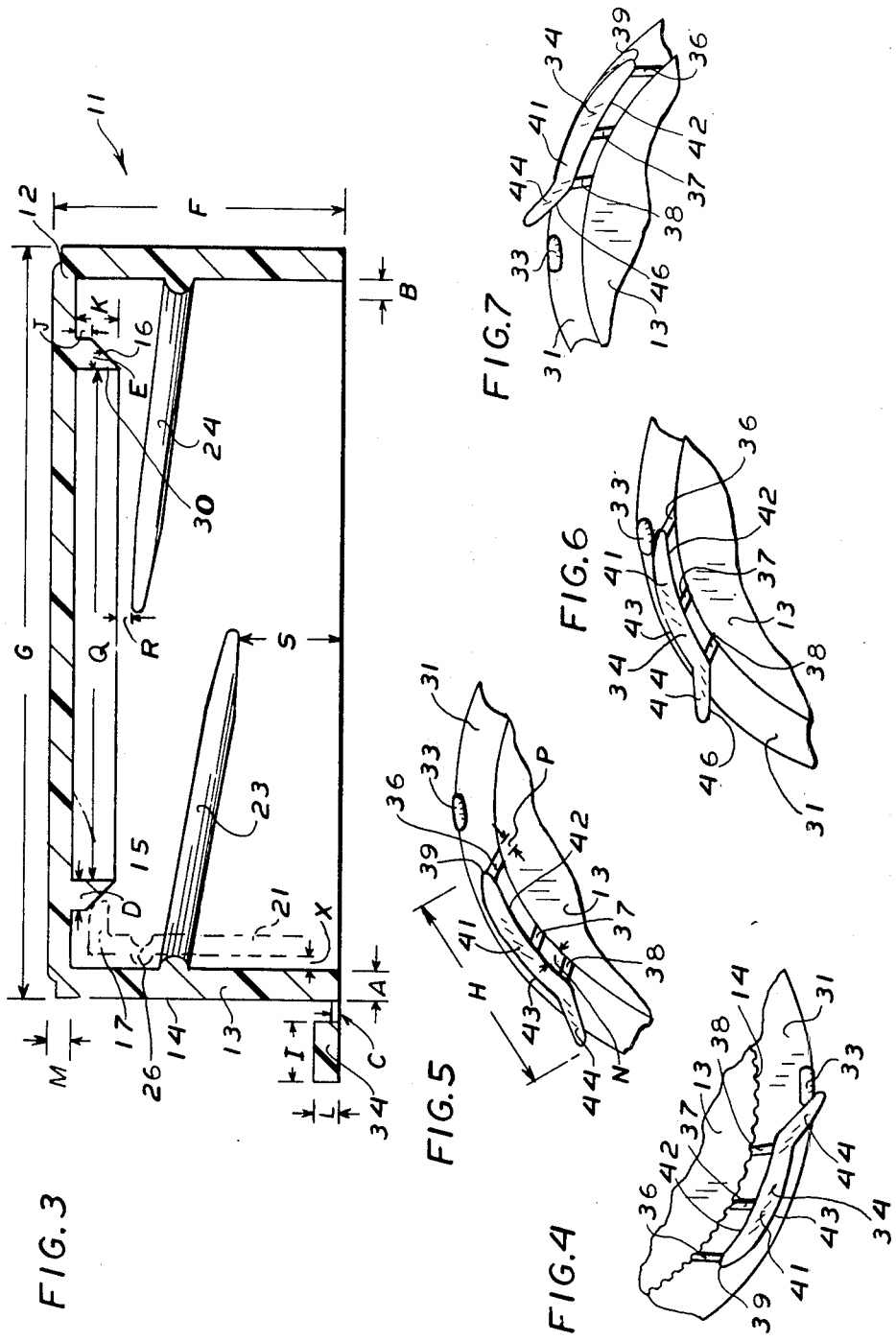

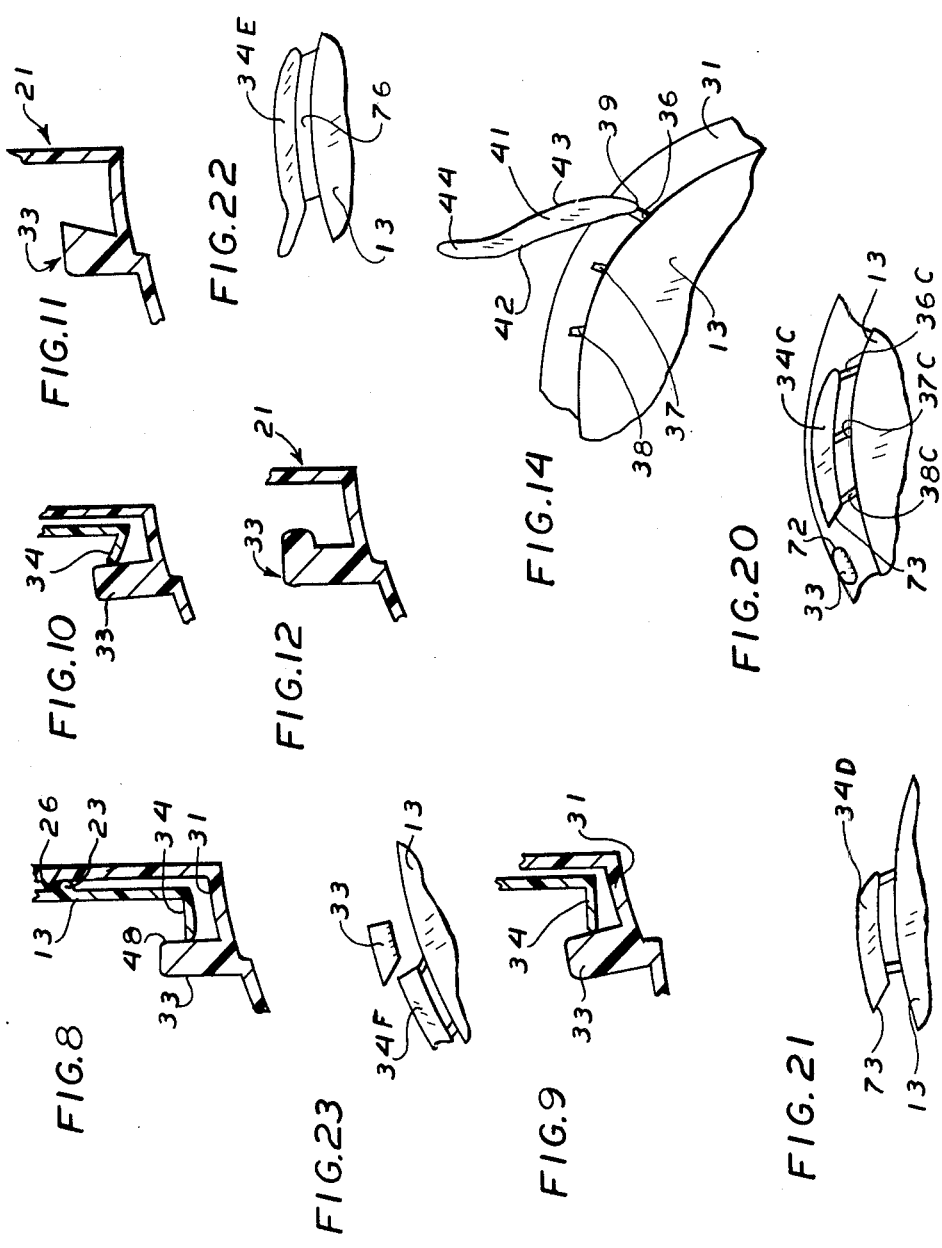

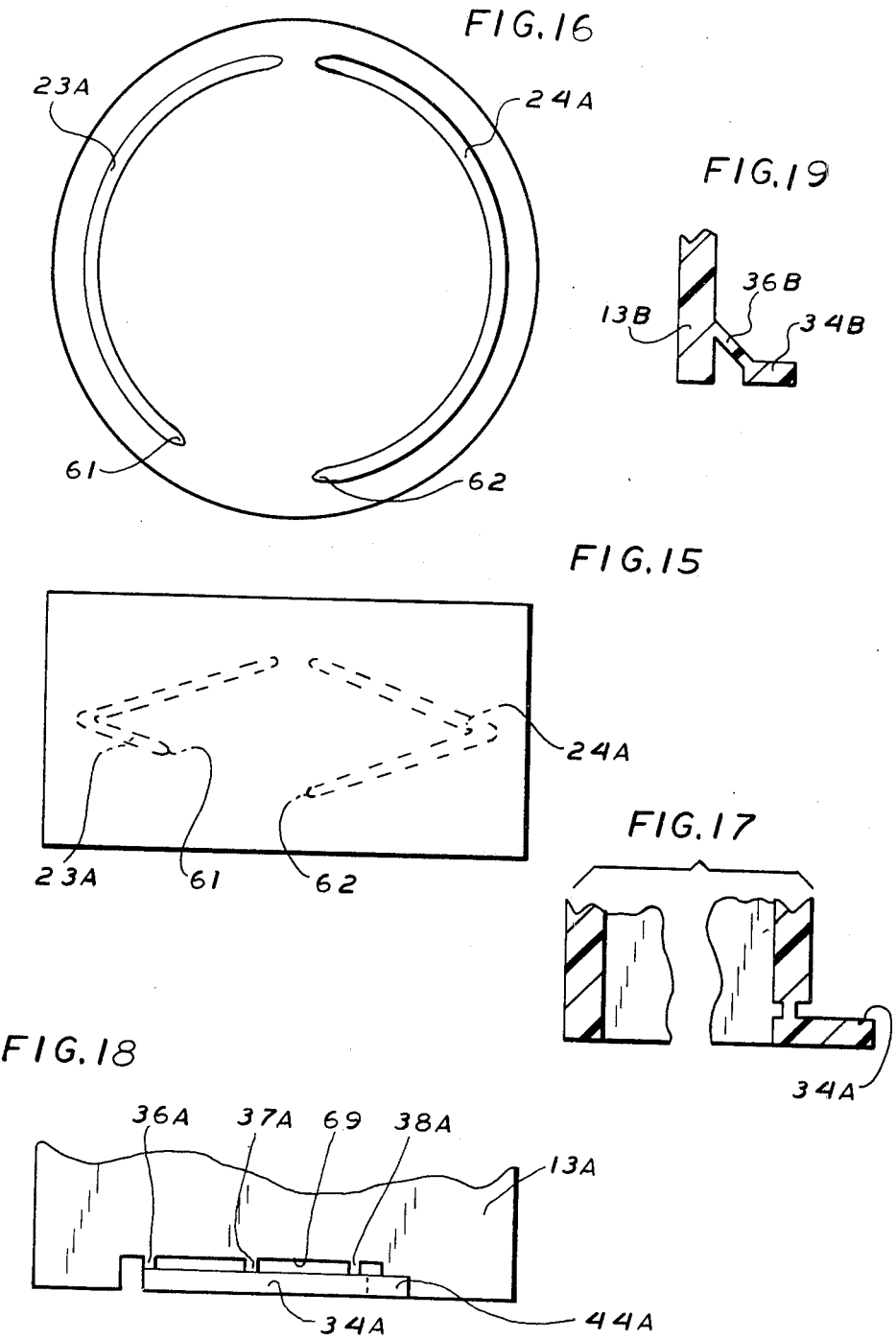

BLOW MOLDED PLASTIC BOTTLE AND ANTI-TAMPER CAP

This is a continuation of application Ser. No. 921,043, filed June 30, 1978, now U.S. Pat. No. 4,180,175 which is a continuation of application Ser. No. 770,025 filed Feb. 18, 1977 now U.S. Pat. No. 4,098,419.

This invention relates to blow-molded plastic milk bottles and plastic screw caps therefor. Products of this type are well known in the art.

With respect to the bottles, see for instance the book "Blow Molding" by Jones and Mullen published 1961 by Reinhold Pub. Corp., N.Y. and the article on "Molding, Blue Molding" in Encyclopedia of Polymer Science and Technology, Volume 9 published 1968 by Interscience. Thin-walled light weight milk containers are commercial products, as described in the article entitled "An Investigation of Lighter Weight Milk Containers" at pages 36, 38, 40, 60, 61, 62 of the Apr. 1974 issue of American Dairy Review. Such light weight bottles have been used commercially in gallon, three quart and half gallon sizes, whose unfilled (and, of course, uncapped) weights are about or more usually less than, 75 grams, 60 grams, and 50 grams respectively. These light weight blown bottles are far from rigid structures. Thus, as pointed out in the article in American Dairy Review, they tend to deform under load. In fact the force involved in pushing against the side of such a bottle to convey it, e.g. on the filling line, causes a very noticeable change in the milk level in the bottle (the walls, though cloudy, are translucent and the liquid level, even in a capped bottle, may thus be readily visible through the bottle walls).

In the molding of the bottles the two substantially identical halves of a mold are brought together around a plastic parison which is being blown into contact with the mold. The parting line of the two mold halves runs vertically, is generally visible on the bottle and defines a plane of symmetry thereof. The bottle neck is simultaneously molded by the use of a neck mold or "neck ring" attached to the top of the mold that forms the main body of the bottle. This neck mold is also in two parts and opens, to permit the blown bottle to be removed; its parting line is usually aligned with that of the two blow mold halves.

With respect to plastic screw caps employed for such bottles, see, for instance, U.S. Pat. Nos. 3,504,818, 3,812,994 and 3,902,621.

Milk bottles must meet rather stringent size requirements in that they must fit into the conventional dairy cases (which may for instance be rectangular, e.g. 12×18 inches interior cross-section, or square, e.g. 12×12 inches interior cross section). These cases are standard in much of the industry; the bodies of trucks employed to transport them and the dimensions of conveyors used to handle them are similarly standardized to conform to the standard case size. Typical cases are about 10¼ inches high, requiring the capped bottles to be, usually, below 10 inches in height; for instance the uncapped bottle may have a height of about 9⅞ inches. The milk bottler wishes to pack as many bottles as possible into each case in order to reduce transportation and handling costs. The bottles generally have handles (as shown, for instance at page 60 of the Apr. 1974 American Dairy Review article cited above) whose presence reduces the available milk-holding volume. Accordingly, the conventional bottles are made with short necks so that for most of the bottle height the bottle cross section is relatively large (and thus of larger milk-holding capacity) as compared to the cross-section of the neck.

Typically the bottle neck has a substantially uniform cylindrical portion 1 (FIG. 1) which has an axial height (dimension "T" in FIG. 1, measured parallel to the vertical axis of the bottle) of less than 0.8 inch, such as about 0.4 inch or 0.6 inch, and the entire screw-thread 2 on that cylindrical portion occupies an axial height (dimension "U" in FIG. 1 which is measured axially from the uppermost point at one end of the thread to the lowermost point at the end of the thread) of less than 0.4", such as about 0.2". The distance from the top of the bottle to upper end of the thread (dimension "W" in FIG. 1) is small, such as about 0.03 to 0.06 inch. The diameter ("V") of the neck is usually in the range of about 1 to 2 inches, such as about 1½ inch.

Although the neck molds employed in the extrusion blow molding are quite round, the nature of the manufacturing operation (including the shrinkage on cooling of the thin-walled bottle after it is discharged from the mold) is such that the mouths of the bottles are often somewhat out-of-round.

Also shown in FIG. 1 are the conventional toothed ratchet portion 4 (adapted to be engaged by the teeth of the anti-tamper locking ring of conventional caps) and a circumferential ridge or "bumper roll" 6, which serves a grippable element for mechanical conveying (e.g. lifting) of the bottles to facilitate packing the bottles into cases.

Some aspects of the invention are illustrated in the accompanying drawings in which FIG. 1 is a side view of a typical conventional milk bottle neck, partly in cross section.

FIG. 3 is a view partly in cross section showing the dimensions of a preferred cap and threads giving an indication of relative positions of the cap and bottle when the cap is seated on the bottle and ready to be screwed on.

FIG. 4 is a top view of a portion of the cap, showing its anti-tamper tab and the relationship thereof to one of the lugs on the bottle, when the cap is first seated on the bottle.

FIG. 5 is a view like FIG. 4 but at a later stage of the screwing on of the cap, showing the tab approaching the other lug on the bottle.

FIGS. 6 and 7 are views like FIG. 5 after further movements of the cap.

FIG. 8 is a cross sectional schematic view of portions of the cap and bottle, when the cap is in the position shown in FIG. 6.

FIGS. 9 and 10 are cross sectional views showing relationships of tab and lug.

FIGS. 11 and 12 show other lug configurations.

FIG. 14 is a view showing a tab portion of a cap and illustrating a variation in which the tab remains attached to the cap after the cap is unscrewed.

FIG. 15 is a side view of a cap showing a modified thread,

FIG. 16 is a bottom view of the cap of FIG. 15,

Figure 24:
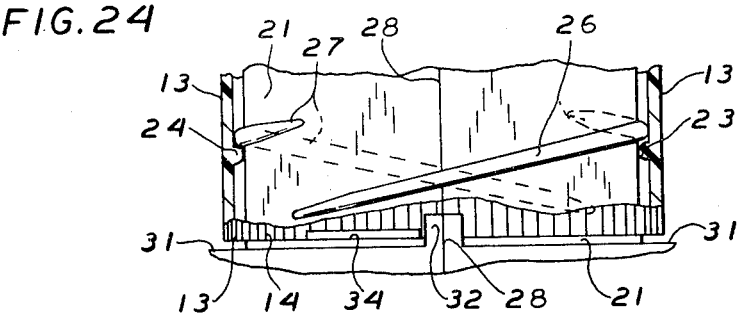
Figure 25:
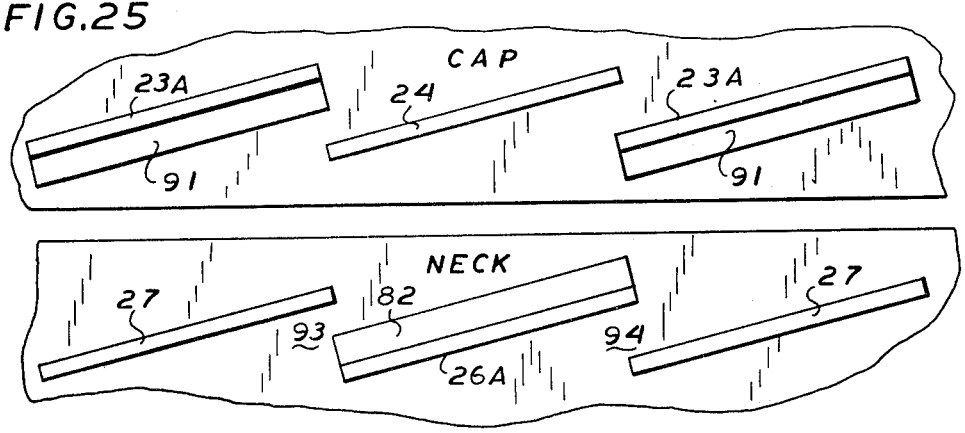
Figure 26:
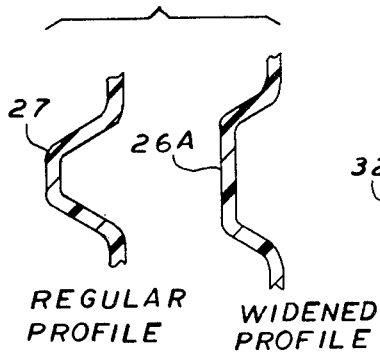
Figure 27:
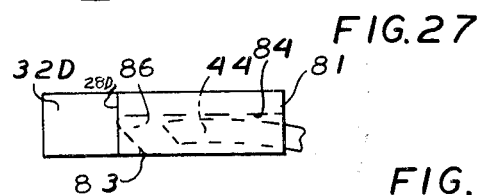
Figures 28, 29:
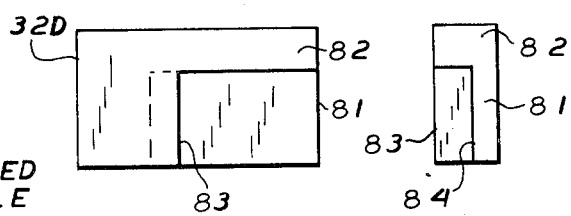

FIG. 17 is a cross-sectional side view, partly broken away, showing a cap having a modified antitamper tab, FIG. 18 is a side view of the cap of FIG. 17, FIG. 19 is a cross section side view of a portion of still another cap having a modified antitamper tab, FIG. 20 is a top view of an antitamper tab like those shown in FIGS. 4–7 and 14 but modified to shorten it, FIG. 21 is a top view of a further modification like FIG. 20 but with a still shorter tab, FIG. 22 is a top view of a modified antitamper tab in which there is a continuous thin frangible web instead of individual connectors, FIG. 23 is a top view of a portion a modified antitamper tab and lug in which the lug has an angled cam face, FIG. 24 is a broken away sideview partly in cross section, showing another relationship between the parts, FIG. 25 is a schematic rolled-out view of the cap threads and bottle threads showing a modified thread arrangement, FIG. 26 is a cross sectional side view showing threads used in the modified arrangement of FIG. 25, FIG. 27 is a top view of a modified form of lug, FIG. 28 is a side view, looking from the neck side, of the lug of FIG. 27, FIG. 29 is an end view, looking from the downstream end, of the lug of FIG. 27.

Like the plastic milk bottle caps of the prior art, the illustrated cap 11 is injection-molded and has a top wall 12, a circular cylindrical internally threaded side wall 13 (preferably having external knurling or vertical ribbing such as serrations or grooves 14), and, projecting from the bottom of the top wall, a thin circular sealing flange or plug 15 which is concentric with the side wall, and has a frusto-conical outer surface 16 for engaging an inwardly projecting thin circular lip 17 at the mouth 18 of the bottle 19.

In the plastic milk bottle caps of the prior art the side wall of the cap typically has a single helical thread which makes substantially a full turn, or slightly more, and the neck 21 of the bottle has a mating single thread which makes slightly more than one full turn (e.g. 1 1/5 turn) around the neck. In the illustrated embodiment the cap has two threads 23, 24, 180° out of phase, each thread making about ½ turn.

The bottle neck has two matching threads 26, 27. The two threads are of identical pitch; in the illustrated construction the pitch is about 3 turns per inch in contrast to the 6 turns per inch used for conventional single thread milk bottle caps so that the cap travels downward about ⅓ inch for each turn thereof. Preferably each thread on the bottle neck is entirely on one side of the bottle mold parting line 28.

The use of the double thread makes for a more secure and reliable leak-proof seal between the sealing plug 15 and the lip 17 even though the total thread lengths on cap and bottle neck are less than in conventional constructions.

Our studies of conventional caps indicate that the relationships of the parts at the initial stages of the screwing on of the cap may be particularly important. In these initial stages, when sealing plug 15 is first coming into contact with the lip 17 a portion of the lip 17 may be depressed to a greater degree than the rest of the lip and a fold may be formed (and eventually set) in the lip, so that the capped bottle tends, too frequently, to leak (presumably at the fold) when the bottle is placed on its side in normal handling or display in the market or in transport from the market. We believe that this may be due to the fact that the conventional caps with single threads permit some tilting of the cap (so that the axes of cap and neck are no longer substantially congruent) in response to the uneven contact between plug 15 and lip 17, during this initial period. With the caps of this invention, however, the double thread inhibits such tilting and enables the forces on the lip to be applied more symmetrically. While we do not wish to be bound by any theory or explanation of the effect, the result is a more reliable leak-resistant seal.

It should be noted, as mentioned above, that since the bottle necks are extrusion blow molded and have thin walls and are subject to shrinkage after molding, their dimensions are not accurately controllable. Thus the mouths of the bottles are often somewhat out of round. For instance when the blow pin (around which the lip 17 is formed during molding) has an external diameter of 1.190 inch, the average internal diameter of the lips 17 is often about 1.15–1.16 inch (such as 1.154±0.006), but the diameters at right angles to each other may differ by some 0.030 or 0.40 inch. The width of the lip is usually in the neighborhood of 0.1 inch. In addition there may be an uneven rough projection 29 at the parting line 28.

Figure 13:
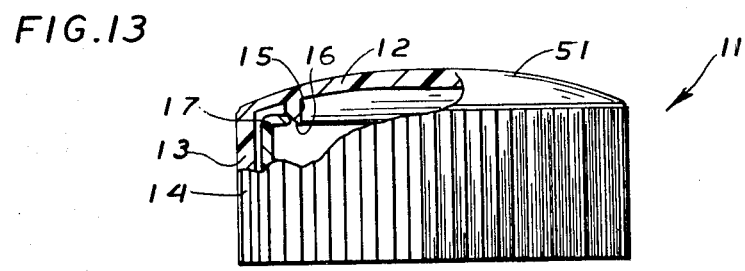
FIG. 13 is a view partly in cross section showing the doming of the normally flat upper wall of the cap.

One preferred form of cap is particularly dimensioned to be used with necks whose average lip internal diameter is about 1.19 to 1.20 inch (such as may be formed by use of a 1.230 inch O.D. blow pin) and whose external diameter at the top is, say, 1.32 inch so that the width of the lip 17 is usually not over 0.1 inch (e.g. 0.04–0.08"). The height K (FIG. 3) 3 of the plug is such that the lower portion of the plug projects below the level of the lip 17 when cap is just seated, (at the start of the screwing on operation) as shown in FIG. 3 and the frusto-conical face 16 engages the lip to an extent such that there is resistance to further screwing on of the cap after, say, about 70° of cap rotation (when the cap has travelled down about 0.05 inch). Further rotation (against increased resistance) forces the lip outward and may, at the end, bring the bottom face 12A of the cap top wall 12 in direct contact with, and pressing against, the top of the neck. Typically the forces (between plug and lip) are such that during this operation the relatively thin and flexible top wall 12 (which is originally substantially flat) is formed into a substantially symmetrical domed configuration as shown in FIG. 13 with the center of the dome 51 being displaced, say, above about 0.02 inch, e.g. about 0.05 inch, from the original plane of the top wall 12. In contrast we have noticed that the tops of conventional caps, when tightly screwed on, often exhibit a very slight, unsymmetrically located, ridge.

The outward force on the lip 17 expands the top of the neck. This may bring the neck threads more tightly into contact with the threads of the cap and thus make it more difficult for one to strip the cap by forcibly screwing it on further.

In the illustrated embodiment the plug 15 increases in thickness along the height of the lip-engaging surface 16 as one approaches the top wall of the cap, and thus becomes more resistant to bending. More specifically, as shown, its inner annular face 30 may be substantially parallel to its vertical axis. Its conical, or otherwise tapered, lip-engaging surface may terminate short of the top wall of the cap, as illustrated; in that case the lip-spreading effect is limited toward the end of the cap rotation.

The use of a double thread also makes it feasible to get a good seal despite the use of a relatively steep pitch.

And the use of a steep pitch makes it possible to obtain full tight closure with about ½ turn or less of the cap thus facilitating the use of the simple and economical anti-tamper arrangement described below.

In the illustrated embodiment there is a substantially horizontal circular annular shoulder 31 at the base of the neck. This shoulder is situated below (preferably only slightly below, e.g. 0.02 to 0.07 inch below) the level reached by the bottom of the cap when the latter is fully screwed on to the neck. In the illustrated embodiment, the dimensions of the cap and bottle neck are such that, before the cap has made one half turn on the neck, further rotation of the cap is prevented by the engagement of the top wall 12 of the cap and the top 31A of the neck.

In the illustrated embodiment the anti-tamper arrangement includes a frangible hook means on the cap and a pair of hook-engageable elements situated 180° apart on the bottle. More specifically the hook-engageable elements comprise two identical upstanding lugs 32, 33 situated along the parting line 28 at opposite sides of the neck 21 and spaced a short distance from the neck, and the hook means comprises a tab 34 joined to the main body of the cap by at least one thin connector. In a preferred embodiment there are three thin connectors 36, 37, 38, and the tab is a flat element which is narrow at its forward leading edge 39 and is tapered and widens gradually to a curved main section 41 of substantially uniform diameter which runs parallel to the circumference of the cylindrical cap wall 13 (said main section being defined by an inner edge 42 curved to conform substantially to the outer surface of the adjacent surface of the cap and a similarly curved outer edge 43 substantially parallel to that inner edge) and an outwardly projecting tail section 44 which is at an acute angle (e.g. a 45° angle) to said circumference.

In use, when the cap threads are first seated on the neck threads (as when the threads are in the position shown in FIG. 3) the tab is out of engagement with a lug 32 or 33 except that a portion of the tab may rest lightly on top of one of the lugs, as shown in FIG. 4. On further rotation of the cap, the cap moves downward and the tab is now at a level to engage effectively the other lug; thus the leading edge 39 of the tab enters the space between a lug (e.g. lug 32) and the cylindrical surface of the cap, as shown in FIGS. 6 and 8. Further rotation of the cap may force the lug to be tilted (as by movement of the wall which supports it) owing to the camming or wedging action of the taper of the tab as shown in FIG. 9 or the wedging force may cause the tab to tilt out of its normally horizontal position (as shown in FIG. 10) or both effects may occur at the same time. The lug itself may remain substantially unbent while the thin lug-supporting shoulder 31 is resiliently deformed to cause the lug to tilt. On still further rotation the tail 44 of the tab engages the lug so that the tail is bent inward and/or the tail and tab are twisted permitting the tail to pass through the space between lug and cap wall. At the end of the rotation the tail has moved past the lug and has snapped out behind it (FIG. 7), to thereafter act like a hook or barb with respect to that lug. (Preferably the cap is so constructed that, when it is screwed on, the tail 44 has moved less than ¼ inch, such as about ⅛ inch or less, past the downstream edge of that lug). Thus, when one attempts to unscrew the cap, the inner edge 46 of tail 44 is engaged by the lug thus forcing the tail outwards thereby breaking the frangible connections 36, 37, 38 so that the tab 34 is sheared completely off the main body of the cap, thus indicating to the customer that the cap has been unscrewed at least once.

In another embodiment, illustrated in FIG. 14, the connection at the forward edge of the tab may be made sufficiently strong so that it is not broken during the unscrewing of the cap. The tab on the cap then may pass in whole or in part through the space between lug and cap and the dangling tab will provide an indication that the cap has been unscrewed at least once.

As molded, the frangible connectors 36, 37, 38 are preferably in chordal relationship to the cap to facilitate their bending so that the tab inner edge 42 can move into engagement with the cap wall 13, when the tab is engaged by a lug. They are preferably of such length (and of such material) that one or more connectors will break before they permit the tab (except for the tail) to move to an on-edge position substantially parallel to the vertical cap wall 13.

The cap is, of course, placed on the bottle after the bottle has been filled. Generally the cap is fed, from a chute, onto the bottle neck without any particular control of the position of the tab with respect to the lugs 32, 33. The cap, resting more or less horizontally on the neck, is brought into contact with a conventional pre-turner which acts to seat the cap properly on the neck, and then the cap is engaged by a rotating chuck (which may be of conventional design) which tightens the cap on the bottle. The pre-turner may, for instance, comprise a set of rotating wheels engaging the sides of the caps; or a flat plate spring-loaded to press down onto the top of the cap and turn the cap; or a stationary serrated bar which is contacted by caps as their bottles are conveyed past it.

The invention makes it feasible to use very light cap constructions which have very thin and flexible walls while still obtaining a secure tight seal and anti-tamper protection. As an example, conventional caps used in the dairy industry weigh about 5 grams. A cap in accordance with this invention may have a weight considerably less than 4 grams but usually more than 2 grams, such as in the range of about 2½ to 3 grams. Thus the cap may have the following approximate dimensions and thicknesses, referring to FIGS. 3 and 5.

A = 0.045 inch
B = 0.40"
C = 0.005–0.010"
D = 0.050"
E = 45°
F = 0.475"
G = 1.535"
H = 0.900"
I = 0.090"
J = 0.060"
K = 0.125"
L = 0.040"
M = 0.035"
N = 0.060"
P = 0.030"
Q = 1.125"
R = 0.005"
S = 0.105–0.110"
X = about 0.045"
Depth of grooves 14 = 0.008–0.012"

Typically the wall thickness of the bottle neck is in the range of, say, about 0.02–0.03 inch such as 0.025 inch, with the thickness of the lip portion 17 being about the same as that of the adjacent neck wall.

The thread cross-sections are preferably conventional "L" style bottle thread cross-sections. (Society of the Plastics Industry, Plastic Bottle Division). This type of thread has a round profile which makes for easy stripping of the threaded cap from the injection mold.

The caps and bottles are molded of thermoplastic material such as the high density polyethylene conventionally employed for plastic milk bottles and caps. Other thermoplastics (e.g. other polyolefins such as conventional stereoregular polypropylene) may be employed, but in view of resistance of polypropylene to breakage on bending its use may require variations in the tab connections (such as making them thinner and/or notched).

In a preferred form of the invention the lug edge 48 which engages the tab is substantially straight and vertical (i.e. parallel to the axis of the neck). It may also be tilted or hooked as shown in FIGS. 11 and 12. Thus the top of the lug may be substantially in contact with the wall of the cap before and after the passage of the tab through the space between the base of the lug and the cap wall.

It will be noted that in the illustrated embodiment the pairs of cap threads 23, 24 do not overlap; that is, each thread of the pair occupies a half turn, or almost a half turn, leaving the other half turn for the other thread of the pair. Such a cap can be produced simply by conventional injection molding and can be removed readily from the mold. The threads may also overlap somewhat but if the degree of overlap is too great (in relation to number of threads per inch etc.) it may be necessary to use a special unscrewing type of mold to provide for removal of the molded cap from the mold; this would increase the expense of manufacture significantly.

While it is simplest and most convenient for both threads to start at about the same level on the cap, with their starting points 180° apart, it is also within the broader scope of the invention (as illustrated in FIGS. 15 and 16) for one thread 23a to have its starting point 61 at a higher level than the starting point 62 of the other thread 24a. In FIGS. 15 and 16 the first 30° or so at the start of thread 23a have been eliminated; for best results one should not, however, eliminate too much of the thread; for instance, when (with the given thread design) some 30° at the start of each thread was eliminated (a loss of 60° of total thread) the cap "stripped" when it was turned forcefully to tighten it fully on the neck.

It is also within the broader scope of the invention for the pair of threads to occupy somewhat less than 180° each, such as 165° each, while being symmetrically positioned around the inner periphery of the cap. Here again it is best not to eliminate too much of the thread, to avoid the tendency to strip.

As is conventional, in the illustrated embodiment the threads of the injection molded caps are solid through-and-through in contrast to the threads on the bottle neck. The latter, being derived by blow molding a parison, are essentially bends in the neck wall which appear as open grooves when viewed from the inside of the mouth of the bottle. In the "stripping" described above (when there is inadequate thread length) the cap threads ride over the more flexible bottle threads without noticeable thread damage.

While the starts 61, 62 of the threads 23a, 24a in FIGS. 15 and 16 are not symmetrically situated, there is symmetry in the principal operative portions of these threads. Thus at any given level in FIGS. 15 and 16 the positions of these threads are substantially 180° apart.

The pairs of neck threads 26, 27 in the illustrated embodiment also do not overlap; each thread of the pair is located entirely to one side of the parting line 28. While this construction is most convenient and economical, the neck threads may overlap if desired (e.g. the lower ends of either or both may extend further around the periphery of the neck). Also, they may run across the parting line, in which case the relationship of their starting points 66, 67 to the position of the lugs 32, 33 will be different, of course, and a corresponding change should be made in the relationship of the position of the cap tab 34 to the starting points of the cap threads. Also, while it is preferred that both neck threads of the pair start and end symmetrically, this is not essential; similar considerations of the symmetry may be applied to the neck threads as in the discussion of the cap threads above.

As indicated above, it is preferred that the tab be so positioned, with respect to the cap threads, that when the cap is fully screwed on the tab has just passed the downstream edge of a lug and has snapped out behind it.

Figure 1:
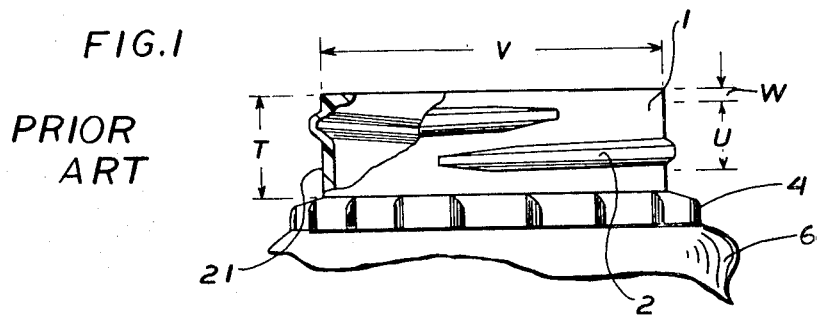
Figure 2:
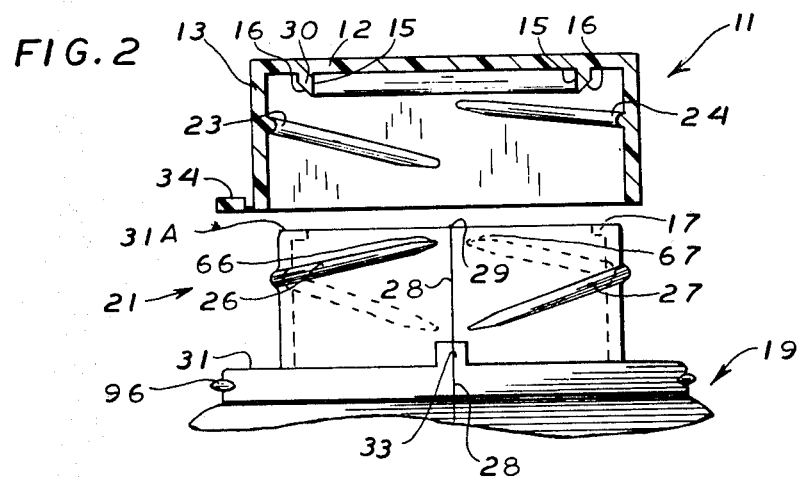
FIG. 2 is a side view of the top of one form of plastic milk bottle in accordance with this invention and a cross sectional side view of a cap therefor.

With the preferred arrangement, in which any lug is at the parting line, the optimum choice of location of the tab on the cap in relation to the cap threads depends on the relationship between the neck threads and the parting line 28. Thus, when the neck thread-parting line relationship is as illustrated in the embodiment shown in FIG. 2, the tab is preferably located at a point on the circumference of the cap about halfway (circumferentially) between the beginning and the end of a cap thread. But when the neck thread-parting line relationship is as illustrated in FIG. 24 the preferred location of the tab is (circumferentially) about at the lower end of a cap thread. This can affect the inward movement of the tab since the cap side wall 13 is flexible and can be moved inwardly locally when the tab is pressed inward against the side wall by the engagement of the tab and a lug. Thus in the arrangement shown in FIG. 24 there will be more resistance to such inward movement because the cap thread 23 (which may press against bottle neck 21) is closer to the tab-carrying portion of the cap side wall, and therefore stiffens that wall portion more, than in the arrangement shown in FIG. 2.

In this application the terms "upstream" and "downstream" are used with reference to the direction of movement of the cap when it is being screwed onto the neck. For instance, the tail 44 is "upstream" of the connection 38, the leading edge 39 first engages an "upstream edge" of lug 32 and the tail 44 later snaps behind a "downstream" edge of lug 32.

It is also within the broader scope of the invention to modify the antitamper construction in various ways. For instance there may be a plurality of tabs 34 (such as two such tabs spaced 180° apart on the cap) instead of a single tab and, with such a construction, there may be only one lug 32 or 33 instead of a pair of lugs. Of course, if the threads are modified (as described below) or if the cap feeder has means for positioning the cap onto the bottle with a predetermined relationship between the positions of the tab 34 and lug 32 (e.g. so that the thread engagement for screwing on the cap begins only when the tab is in the position shown in FIG. 3 with its tail about 180° from the lug 32) then the other lug 33 may be omitted. The connectors between tab and cap body may extend vertically (parallel to the axis of the cap) as illustrated in FIGS. 17 and 18, or diagonally as illustrated in FIG. 19. Thus, FIGS. 17 and 18 show tab 34A, connectors 36A, 37A and 38A, tab tail 44A and cap side wall 13A: a portion of the bottom of wall 13A is raised at 69 to receive the tab. FIG. 19 shows tab 34B, a connector 36B and a portion of the cap side wall 13B. All or part of the tail 44 may be eliminated; see for instance FIG. 20 in which the rear, or upstream, edge 71 of tab 34C is so shaped that, on unscrewing, the engagement of that upstream edge and the adjacent wall 72 of lug 32 forces that upstream edge outward thereby breaking connectors 38C and 37C; see also FIG. 21 in which the tab 34D is shorter, with only two connectors, and has a similar upstream edge 73. Also as shown in FIG. 22 there may be a thin frangible web 76 of plastic (instead of all, or some of, the connectors) joining the tab 34E to the cap wall 13. As shown in FIG. 23 the leading downstream edge 77 of the tab need not be tapered when the upstream edge of the lug is tapered to cam that tab edge inwards as the cap is screwed on.

As indicated in FIGS. 27–30 the lug may be constructed so that the effective downstream portion thereof (i.e. the portion which effectively engages the end of the tab to deform the tab when the cap is unscrewed) is concealed. This makes it more difficult to unscrew the cap, without breaking the tab, by manipulating the tab tail into the space between lug and cap. In one such embodiment the lug is effectively lengthened in a downstream direction to provide a cover over the top and the outside of the tab end. Thus, as shown in FIGS. 27 to 29 the lug 32D has integral outside extension 81 and top extension 82 so that, when the tab tail 44 snaps back after clearing the effective downstream edge 83 of the lug, the tail is within an inwardly-facing covered recess. At this point the tail 44 may be restrained from full outward movement by engagement between the tail and the wall 84 of the outside extension 81 as shown in FIG. 27. In one embodiment the lug is formed with a pocket 86 upstream of edge 83 so that when the cap is unscrewed the end of tail 44 moves past edge 83 into pocket 86 and is restrained from moving with the cap. 28D indicates the mold parting line.

While less desirable, it is also within the broader scope of the invention to use locking ring arrangements, as shown for instance, in the previously mentioned U.S. Pat. Nos. 3,504,818, 3,812,994 or 3,902,621 (with corresponding ratchet teeth on the bottle neck) or a ratcheted rim and lips arrangement as shown for instance in U.S. Pat. No. 3,805,987.

While a two-start thread arrangement is preferred, it is within the broader scope of the invention to use more than two starts, e.g. 3 or 4. For instance the cap may have 3 identical threads, each making an almost 120° turn, symmetrically arranged on its inner periphery, and the neck may have 3 matching symmetrically arranged threads each of which may extend for 120° or preferably more (such as 180°) around the neck. With such an arrangement the antitamper device may comprise a ratcheted locking ring (as illustrated in the prior art, with the ratcheted part of the neck extending around the entire circumference of the neck); or there may be a single lug 32 or 33 with a single tab 34 when using arrangements (previously mentioned) which place the cap on the bottle with its tab in pre-determined relationship to the lug, e.g. with the tab tail about 120° forward of the lug; or, less desirably, the cap may have three tabs and the bottle may have a single lug.

As indicated above only one lug 32 or 33 is needed when the cap starts threading with its tab in predetermined position. This may be accomplished, without using a special cap feeder, by modifying the threads. One way to do this is to have one thread (of the multiple thread of both cap and neck) different from the other(s). Thus, as shown schematically in FIGS. 25 and 26, the profile of said other thread(s) may be widened by adding to their widths on the bottom side 91 of the cap thread and the top side 92 of the neck thread (i.e. at the sides on which the threads ride before effective thread screwing-on engagement occurs); the degree of thread widening is such that the widened cap thread 23A cannot enter the space 93 between the top of the widened bottle thread 26A and the regular bottle thread 27 but can enter the space 94 between the top of the regular bottle thread 27 and the bottom of the upwardly widened bottle thread 26A. Thus the threads will start to engage effectively only in the latter case. The additions 81 and 82 need not be continuous or even of uniform width along the length of their threads. Also the lug may be of sufficient height that when the tab rests on it the cap is raised sufficiently to inhibit thread-starting at the undesired position.

In the illustrated embodiment the bottle has a pair of spaced ridges 96 (FIG. 2) to serve as grippable elements in the conveying of the bottles.

The illustrated antitamper arrangement may also be used with conventional single start threads, and (particularly in that case) the cap sealing arrangement need not be of the plug-lip type; thus the top wall of cap may have a soft lip-engaging surface (which may be, for instance, a highly porous plastic liner, e.g. of foamed polystyrene, "Styrofoam") which seals against the top of the neck in a well known manner. Also, with a single start thread, only one lug (32 or 33) is needed since there is only one proper position for the end of the screwing-on operation; that one lug, like the lugs 32, 33 is preferably positioned at the mold parting line (either astride that line, or at the line but substantially entirely on one side of the line) for ease of blow molding.

As mentioned earlier, the blow molded bottles are light weight easily deformed structures which are made of just enough plastic material to provide the stiffness needed for them to perform their milk-holding function reliably. Typically the uncapped weights are in the range of about 50–70 grams for the gallon size, about 40–55 (e.g. 50) grams for the three quart size and about 30–45 grams for the half-gallon size, when the bottle material is, as is now conventional, substantially unoriented linear polyethylene (e.g. of 0.96 specific gravity). Blow molding in such fashion as to produce biaxial orientation can give increased stiffness and strength for a given weight of material and thus make it possible to decrease the weights of the bottles substantially (e.g. by about 30%.)

Typically blown plastic milk bottles have a generally square or rectangular configuration (in plan view; see FIG. 6 of the American Dairy review article) with rounded corners, and with the neck at the center and the handle along the parting line. Typical approximate dimensions, in plan view, are about 6"×6" or 4"×6" or 4"×5½" or 4½"×4½".

In the illustrated embodiments both the cap threads and the neck threads extend helically over a major portion of the total circumference; the total extent of the cap threads covers, for instance, well over 240° of the 360° circumference. The flexibility of neck and cap are such (owing to the nature of the plastic employed and the thinness and configuration of the walls) that if one used a standard lid structure (having spaced thread-engaging lugs, for instance) for a multi-start threaded neck (such as shown in U.S. Pat. Nos. 3,165,220, 2,952,374 or 3,840,143) the threads would "strip", as discussed above.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. A combination of a blow molded plastic milk bottle and a plastic cap comprising:
   (a) a neck at the mouth of said bottle, said neck having an upper, inwardly directed circumferential lip, and an exterior cap-holding projection
   (b) said plastic cap adapted to be affixed on said neck to cover said mouth and having an exterior side wall and an interior downwardly directed circular plug for engaging said lip, when said cap is affixed on said neck, to form an anti-leak seal by pressing against said lip, said side wall having an interior projection for engaging said cap-holding projection of said neck, the construction and arrangement of said projections being such that their said engagement retains said cap symmetrically on said neck, said plug having a circular outer surface for engaging said lip, said outer surface being tapered to increase in diameter upwardly and to exert outward and downward force on said lip and a corresponding upward, inward force on said surface when cap is affixed on said neck, the construction and arrangement, including the wall thickness of said cap, being such that when said cap is affixed on said neck said forces push the upper wall of said cap into a substantially symmetrically domed configuration with the center of said top wall being displaced upward at least about 0.02 inch from its original position with respect to the side wall of said cap, and
   (c) cooperating antitamper means on said cap and bottle and including a permanently deformable element, said antitamper means permitting said cap to be moved in one direction to affix said cap on said neck to bring said plug into sealing relation to said lip and then preventing movement in the opposite, cap-removing, direction unless said element is visibly deformed.

* * * * *